United States Patent

Morimoto et al.

[11] Patent Number: 5,297,292
[45] Date of Patent: Mar. 22, 1994

[54] BUS SYSTEM WHEREIN A BUS-USING REQUEST SIGNAL IS ISSUED IN ADVANCE OF A DETERMINATION THAT A BUS IS TO BE USED AND IS THEREAFTER CANCELLED IF THE BUS IS NOT USED

[75] Inventors: Shigeki Morimoto; Norikazu Endo; Toshihiko Nakauchi, all of Hadano, Japan

[73] Assignee: Hitachi, Ltd., Tokyo, Japan

[21] Appl. No.: 698,956

[22] Filed: May 13, 1991

[30] Foreign Application Priority Data

May 11, 1990 [JP] Japan .................. 2-121893

[51] Int. Cl.$^5$ .................. G06F 13/36; G06F 15/16
[52] U.S. Cl. .................. 395/725; 395/325;
370/85.2; 364/242.6; 364/242.92; 364/240;
364/240.2; 364/DIG. 1
[58] Field of Search ............... 364/DIG. 1 MS File,
364/DIG. 2 MS File; 395/325, 725, 200;
340/825.5; 370/85.2

[56] References Cited

U.S. PATENT DOCUMENTS

| 4,423,384 | 12/1983 | DeBock | 328/152 |
|---|---|---|---|
| 4,449,183 | 5/1984 | Flabiuge et al. | 395/425 |
| 4,620,278 | 10/1986 | Ellsworth et al. | 395/325 |
| 4,837,682 | 6/1989 | Culler | 395/325 |
| 4,897,784 | 1/1990 | Nay | 395/325 |
| 4,941,086 | 7/1990 | Keriz | 395/325 |
| 4,961,140 | 10/1990 | Pechanek | 395/325 |
| 4,982,321 | 1/1991 | Pantry et al. | 395/325 |
| 5,008,817 | 4/1991 | Shibata et al. | 395/325 |
| 5,058,006 | 10/1991 | Durdan et al. | 395/325 |
| 5,088,028 | 2/1992 | Thews et al. | 395/325 |
| 5,140,680 | 8/1892 | Best | 395/325 |
| 5,179,705 | 1/1993 | Kent et al. | 395/725 |
| 5,239,631 | 8/1993 | Boury et al. | 395/325 |

FOREIGN PATENT DOCUMENTS 1-205365  8/1989  Japan .................. G06F 13/36

Primary Examiner—Gopal C. Ray
Attorney, Agent, or Firm—Antonelli, Terry, Stout & Kraus

[57] ABSTRACT

A method is provided for controlling bus-using rights in a multi-bus system which has a plurality of buses and a plurality of units connected to each of the buses. A unit connected to one bus is accessible by another unit connected to another bus. When a first unit accesses either a second unit on the one bus or a third unit on another bus, two requests for use of the one and another buses are issued substantially at the same time, thereby reducing the time taken for acquiring a bus-using right of the another bus. As soon as it is found that access is directed to the second unit on the one bus, the request for using the another bus is canceled, thus reducing a bus occupation rate for the another bus.

3 Claims, 2 Drawing Sheets $T_2 < T_1$
$T_2 + T_3 > T_1$

BUS SYSTEM WHEREIN A BUS-USING REQUEST SIGNAL IS ISSUED IN ADVANCE OF A DETERMINATION THAT A BUS IS TO BE USED AND IS THEREAFTER CANCELLED IF THE BUS IS NOT USED

BACKGROUND OF THE INVENTION

1. Field of the Invention

The present invention relates to a bus-using right control system for a bus system which requires real-time or immediate processing in data transfer.

2. Description of the Related Art

In a conventional bus-using right control system, data transfer is carried out as follows:

First, in a bus system where a plurality of units are connected to a single bus, data transfer between one unit or a unit A and another unit or a unit B is usually carried out in the following procedure. That is, the unit A sends a bus-using request to a bus arbiter, and, when none of other units is using the bus, the bus arbiter gives permission to the unit A. Thus, the unit A obtains a bus-using right and is then allowed to use the bus to carry out data transfer.

Second, in a multibus system where a plurality of units are connected to a plurality of buses, as disclosed in Japanese Laid-Open Patent Publication (KOKAI) No. 1-205365, data transfer is carried out between a unit A connected to one bus or bus 1 and a unit B connected to another bus or bus 2, in the following procedure (1) or (2). (1) The unit A sends a bus-using request to a first bus arbiter of bus 1, and after obtaining a bus-using right for bus 1, the unit A outputs address information to bus 1. The address information is decoded and then a bus-using request is sent to a second bus arbiter of bus 2 to obtain a bus-using right for bus 2. After successively obtaining the bus-using rights for bus 1 and bus 2, the data transfer is carried out. (2) The unit A sends bus-using requests to the first and second bus arbiters of bus 1 and bus 2 at the same time, and after obtaining both the bus-using rights for bus 1 and bus 2, the data transfer is carried out.

In the above-described first and second (1) conventional bus systems, before a unit actually starts the data transfer, the bus-using rights should be obtained, which requires excess time, causing the access to be delayed. In the second (2) conventional bus system, in order to realize a quick access, the bus-using rights for two buses are obtained at the same time. However, in the data transfer between units connected to the same bus, the bus-using right for another bus is obtained unnecessarily, causing a bus occupation rate higher than necessity.

SUMMARY OF THE INVENTION

Accordingly, it is an object of the present invention to provide a method for controlling bus-using rights and a bus system employing the same, free from the drawbacks of the prior art, which is capable of seemingly removing time for obtaining a bus-using right to improve an access time and immediate operation in data transfer.

It is another object of the present invention to provide a method for controlling bus-using rights and a bus system employing the same which is capable of reducing a bus occupation rate.

In accordance with one aspect of the present invention, there is provided a method for controlling bus-using rights in a multi-bus system which has a plurality of buses and a plurality of units connected to each of the buses such that a unit connected to one of the buses is accessible to another unit connected to another of the buses, the method comprising the steps of issuing, when a first unit on one bus accesses either a second unit on the one bus or a third unit on another bus, two requests for use of the one and another buses substantially at the same time; and canceling the request for using the another bus when it is found that the access is directed to the second unit on the one bus.

In accordance with another aspect of the present invention there is provided a bus system, comprising a first bus; a first master unit and a first slave unit each connected to the first bus; a first bus arbiter for carrying out arbitration of a bus using right of the first bus; a second bus; a second master unit and a second slave unit each connected to the second bus; an address decoder for discriminating whether the second master unit is to access which one of the first and second slave units; and a second bus arbiter for carrying out arbitration of a bus using right of the second bus, for outputting a bus-using request signal for the first bus to the first bus arbiter in response to a bus-using request signal outputted from the second master unit, and for discarding the bus-using request signal for the first bus to the first bus arbiter according to a signal, outputted from the address decoder, which represents the second master unit is going to access the second slave unit.

In accordance with a further aspect of the present invention, there is provided a method for controlling a bus-using right in a bus system wherein first and second master units and at least one slave unit are connected to a common bus and at least said first master unit accesses the slave unit via the common bus to transfer data therebetween at predetermined time (T1) intervals, the method comprising the steps of issuing bus-using request a predetermined time T2 ($<$T1) after said first master unit started the previous data transfer, to acquire a bus-using right in advance; and allowing said first master unit to start data transfer immediately when the time T1 has passed after starting the previous data transfer.

In this method, preferably, the bus-using right is discarded when no data transfer is required after a third predetermined time T3 (wherein T2+T3$\leq$T1) from the issue of the bus-using request.

In accordance with still another aspect of the present invention, there is provided a method for controlling a bus-using right in a bus system in which a plurality of units are connected to a common bus and at least one of the units uses the common bus at predictable timings, the method comprising the steps of: issuing a bus-using request for the one of the units a predetermined time before the predicted timing of use of the common bus to acquire a bus-using right in advance; and allowing the one unit to use the common bus immediately when the predetermined time has elapsed.

In this method, preferably, the bus-using right is discarded when no data transfer is required after the predetermined time from the time that it is estimated that at least one of the two master units uses next the common bus.

In accordance with a further aspect of the present invention, there is provided a bus system with a plurality of units connected to a common bus wherein at least one of the units uses the common bus at predictable timings, the bus system comprising a bus arbiter for carrying out arbitration of a bus-using right of the common bus; a first timer means for measuring time to estimate a timing at which said one unit will next use the common bus; and a request control means responsive to an output of the first time means for generating a bus-using request to the bus arbiter.

This bus system preferably further comprises a second timer means for measuring a time during which said common bus is not used, and for causing the request control means to cancel the bus-using request when a predetermined time has been measured.

In the multi-bus system of the present invention, since a procedure for a master unit on a bus to acquire a bus-using right of another bus is started not after it turned out but started before that time, the time taken for acquiring the another bus is seemingly eliminated to thereby reduce the access time.

Further, the acquired bus-using right is discarded immediately after it turned out that no data therefor is required using the another bus, thus avoiding occupation of the another bus any more than necessary.

Also, in a common bus system wherein requests of data transfer are issued at regular intervals of time T1, or a timing of the next bus use is predictable, a bus-using request is issued in advance before the predicted timing such that the bus-using right would have already been acquired to thereby reduce the access time.

Further, if no data transfer is required when a predetermined time passes after the acquisition, the acquired bus-using right is discarded, thus avoiding occupation of the common bus any more than necessary.

These and other objects, features and advantages of the present invention will be more fully apparent from the following description of the preferred embodiments with reference to the accompanying drawings.

DESCRIPTION OF THE PREFERRED EMBODIMENTS

Figure 1:
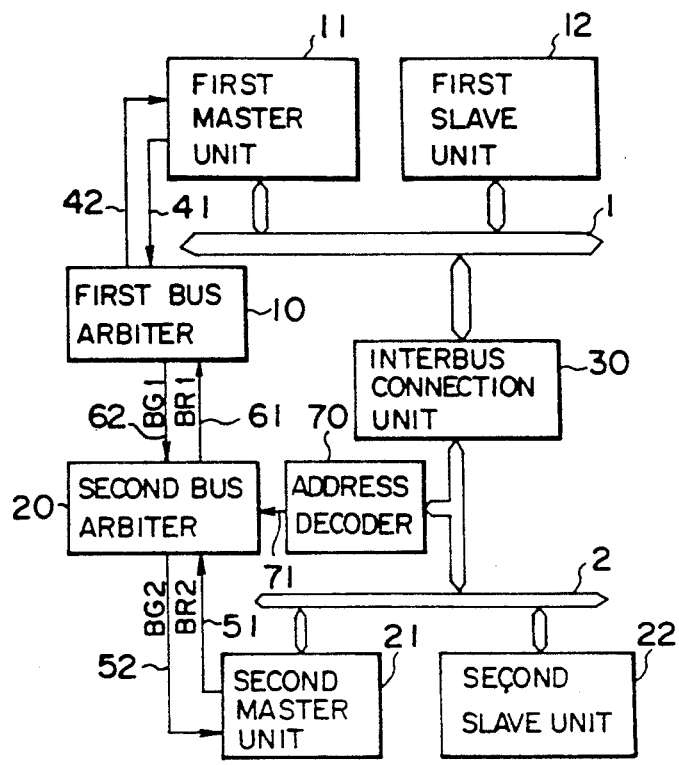
FIG. 1 is a block diagram of a first embodiment of a bus-using right control system according to the present invention.

Referring now to the drawings, there is shown in FIG. 1 a first embodiment of a bus-using right control system according to the present invention.

In FIG. 1, one master unit and one slave unit are shown for each bus for simple explanation and better understanding. Master units may include not only a processor but also a DMA controller and the like. Slave units may include a memory, an input/output device and the like.

As shown in FIG. 1, a first master unit 11 and a first slave unit 12 are connected to a first bus 1. A bus-using right control for the first bus 1 is carried out by a first bus arbiter 10. The first master unit 11 outputs a first bus-using request signal 41 for the first bus 1 to the first bus arbiter 10, which in turn gives a first bus using grant signal 42 for the first bus 1 to the first master unit 11. A second master unit 21 and a second slave unit 22 are connected to a second bus 2. A bus-using right control for the second bus 2 is carried out by a second bus arbiter 20. The second master unit 21 outputs a second bus-using request signal 51 for the second bus 2 to the second bus arbiter 20, which in turn gives a second bus using grant signal 52 for the second bus 2 to the second master unit 21.

The first and second buses 1 and 2 are connected to each other via an interbus connection unit 30. The second bus arbiter 20 sends a bus-using request signal 61 for the first bus 1 to the first bus arbiter 10, and the first bus arbiter 10 feeds a bus using grant signal 62 for the first bus 1 to the second bus arbiter 20. Address information outputted on the second bus is decoded in an address decoder 70, and the address decoder 70 provides the second bus arbiter 20 with a second bus selection signal 71 which represents that the address information is for accessing a unit connected to the second bus 2.

Figure 2:
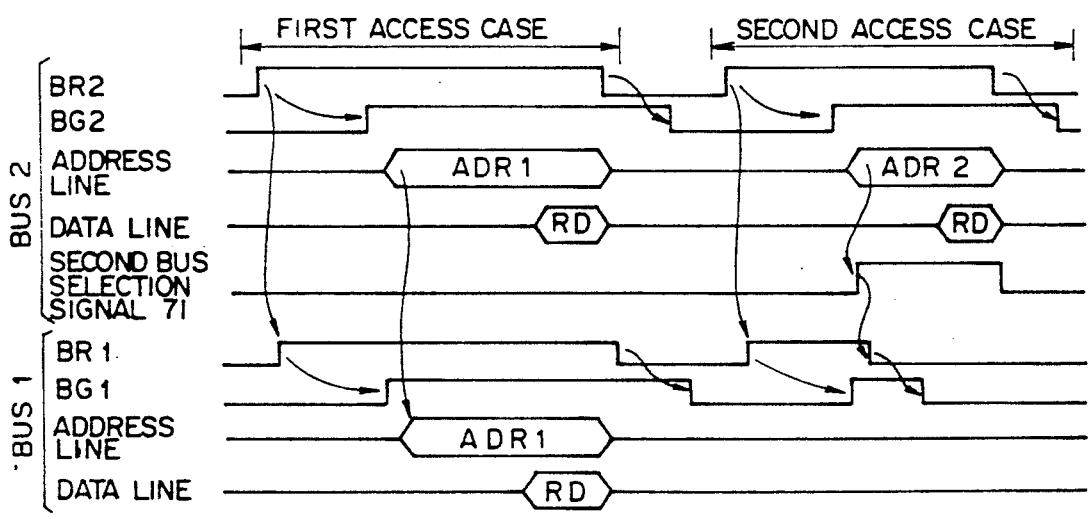
FIG. 2 is a timing chart showing an operation of the system shown in FIG, 1.

In FIG. 2, there is shown a timing chart for showing the operation of the bus-using right control system shown in FIG. 1. This timing chart exhibits two cases of accessing slave units, that is, in the first access case, the second master unit 21 reads data out of the first slave unit 12, and in the second access case, the second master unit 21 reads data out of the second slave unit 22.

When the data transfer is carried out between the second master unit 21 and the first or second slave unit 12 or 22, in order to obtain first the second bus-using right for the second bus 2, the second bus-using request signal 51 or BR2 is turned to ON. At this moment, since the second master unit 21 does not output an address, it is not known which of the first or second slave unit 12 or 22 is to be accessed. When the second bus-using request signal BR2 is turned ON, the second bus arbiter 20 switches the bus-using request signal 61 or BR1 to ON in order to obtain the first bus-using right for the first bus 1. Then, when no other unit uses the second bus 2, the second bus arbiter 20 switches the second bus using grant signal 52 or BG2 to ON. Also, when no other unit uses the first bus 1, the first bus arbiter 10 switches the bus using grant signal 62 or BG1 to ON.

With the second bus using grant signal BG2 turned ON, the second master unit 21 outputs the first address information ADR1 to the address line of the second bus 2. The address decoder 70 decodes the address information ADR1 to know which of the first or second slave unit 12 or 22 is an object to access.

First, in case that the access object is the first slave unit 12 (a first access case), the address information is outputted to the address line of the first bus 1 through the interbus connection unit 30. Hence, the first slave unit 12 outputs data RD corresponding to the address information to the data line of the first bus 1. This data RD is then outputted to the data line of the second bus 2 via the interbus connection unit 30, and the second master unit 21 can receive the data RD through the data line.

In this embodiment, it should be noted that the bus-using request signal BR1 for the first bus 1 is turned ON not after the address information output to the address line of the second bus 2 has decoded but immediately after the second master unit 21 has switched the second bus-using request signal 51 or BR2 to ON. As a result, the first and second bus-using rights for the first and second bus 1 and 2 can be obtained in parallel, the time taken for obtaining the first bus-using right for the first bus 1 is seemingly gone or zero.

Second, in case that the access object is the second slave unit 22 (the second access case), the second slave unit 22 outputs data RD in response to the second address information ADR2 onto the data line of the second bus 2, and the second master unit 21 receives the data RD via the data line. On the other hand, at the time that the address information is outputted to the address line of the second bus 2, the address decoder 70 decodes its address and turns the second bus selection signal 71 ON. With the second bus selection signal 71 turned ON, the second bus arbiter 20 recognizes that the first bus 1 is not required any more, and turns the bus-using request signal 61 or BR1 for the first bus 1 OFF to discard the first bus-using right.

As described above, in this embodiment of the present invention, since the bus-using request signals for the first and second buses 1 and 2 are turned ON almost at the same time irrespective of the access destination, two bus-using rights can be obtained in the time for obtaining one bus-using right to thereby improve or reduce the access time. Further, immediately after it is discriminated that the access destination is not the first bus 1 by decoding the address information, the bus-using right for the first bus 1 is discarded, and hence the first bus 1 is not occupied any more than necessary to thereby avoid increasing the bus using rate of the first bus 1.

In the example shown in FIG. 1, although only the second master unit 21 can access the first slave unit 12 connected to the first bus 1 on the other side, the first master unit 11 may be enabled to access the second slave unit 22 connected to the second bus 2, for example, by providing another address decoder (not shown) between the first bus 1 and the first bus arbiter 10 in the same manner as the address decoder 71 placed between the second bus 2 and the second bus arbiter 20. In this case, the first bus arbiter 10 outputs a bus-using request signal (not shown) for the second bus 2 to the second bus arbiter 20, which in turn outputs a bus using grant signal (not shown) for the second bus 2 to the first bus arbiter 10. Then, address information outputted to the first bus 1 is decoded by the another decoder, and the another decoder feeds a first bus selection signal (not shown) which represents that this address information is for accessing a unit connected to the first bus 1, to the first bus arbiter 10 in the same manner as the address decoder 70.

Figure 3:
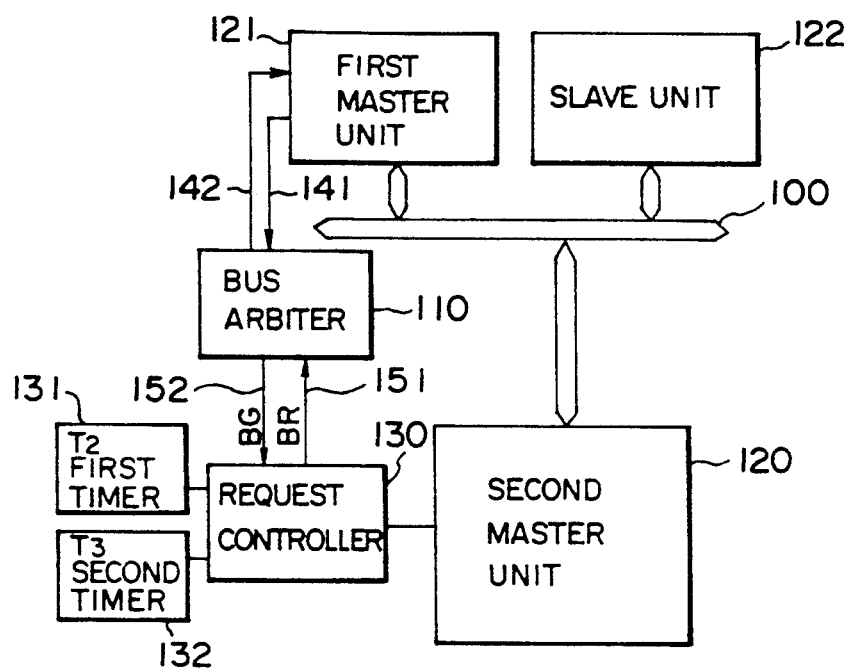
FIG. 3 is a block diagram of a second embodiment of a bus-using right control system according to the present invention.

In FIG. 3, there is shown a second embodiment of a bus-using right control system according to the present invention. In this embodiment, for simple explanation and better understanding, two master units and one slave unit are shown. As shown in FIG. 3, first and second master units 121 and 120 and a slave unit 122 are connected to a single bus 100. A bus-using right control for the bus 100 is carried out by a bus arbiter 110. The first master unit 121 outputs a bus-using request signal 141 to the bus arbiter 110, and the bus arbiter 110 outputs a bus using grant signal 142 to the first master unit 121. A bus-using request for the second master unit 120 is carried out by a request controller 130 coupled thereto. The request controller 130 outputs another bus-using request signal 151 to the bus arbiter 110, and the bus arbiter 110 outputs another bus using grant signal 152 to the request controller 130. The request controller 130 is provided with first and second timers 131 and 132 connected thereto.

Figure 4:
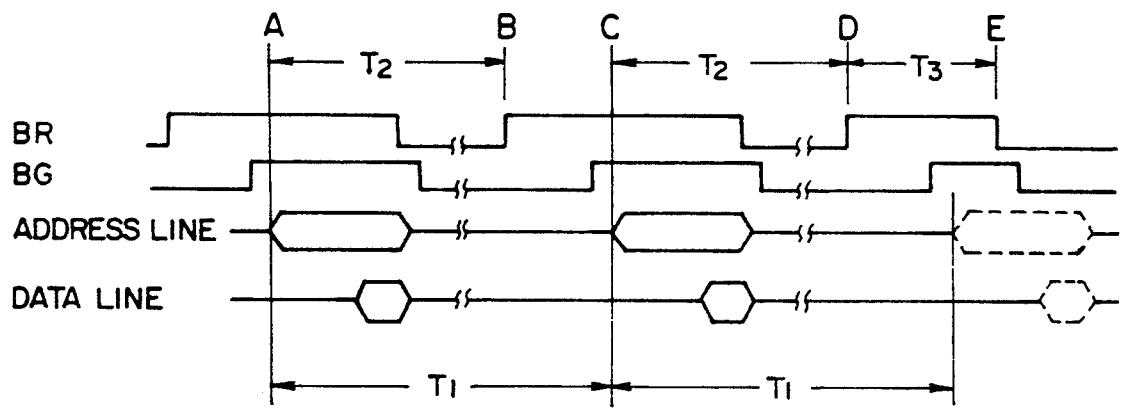
FIG. 4 is a timing chart showing an operation of the system shown in FIG. 3.

In FIG. 4, there is shown a timing chart which illustrates the operation of the bus-using right control system shown in FIG. 3. In this embodiment, the data transfer between the second master unit 120 and the slave unit 122 is assumed to be carried out at intervals of a time period T1. The time value T2 of the first timer 131 is determined so as to satisfy "T2+(time taken for obtaining bus-using right)=T1", and the time value T3 of the second timer 132 is determined so as to satisfy "T2+T3>T1". The request controller 130 drives the first timer 131 to start at the time the second master unit 120 starts to use the bus 100 (point A or point C in FIG. 4). When time T2 has elapsed from the time point A, or at the time point B or point D in FIG. 4, the request controller 130 turns the bus-using request signal (BR) 151 ON and drives the third timer 132 to start. With the bus-using request signal BR turned ON, the bus arbiter 110 switches the bus using grant signal (BG)152 ON as soon as any unit stops using the bus 100.

Usually, at the time point C in FIG. 4 after time T1 has elapsed from the previous time to start using the bus (point A in FIG. 4), the second master unit 120 will use again the bus 100. At this moment, since the bus-using request signal 151 has already been turned ON at the point B before the point C, the bus using grant signal 152 is also already changed to ON at the point C, and the second master unit 120 can use the bus 100 immediately. Thus, the access is quickened.

It is possible that the second master unit 120 does not require using the bus 100 for some reasons even when time T1 has passed after the previous bus use. When the second master unit 120 does not require the use of the bus 100 at the time point E in FIG. 4 after time T3 has elapsed from the time point D at which the bus-using request signal (BR) 151 was turned ON, the request controller 130 switches the bus-using request signal BR to OFF to discard the bus-using right. Further, when the bus 100 has been used as usual, the second timer 132 is reset before it reaches the time T3.

As described above, in this embodiment of the present invention, for the master unit for usually carrying out the data transfer every predetermined time period, the increase in access time for obtaining the bus-using right is eliminated or reduced to thereby realize immediate processing in data transfer. Further, in an irregular operation that the data transfer is not carried out even when a predetermined time has passed after the bus-using right is obtained, as soon as it is recognized that the bus is not used, the bus-using right is discarded to prevent the bus occupation rate from increasing any more than necessary.

In the embodiment shown in FIG. 3, although it is assumed that the data transfer between the second master unit 120 and the slave unit 122 is carried out every predetermined time T1, in a case that the data transfer is carried out in alternate time periods such as T1 and T1' rather than every predetermined time, and further in a normalized case that the next time point for requiring a bus use is known or presumed, the present invention can be applied. In such a case, modifications will be added as follows. That is, it is important that a bus-using request is issued a time period T0 earlier prior to the next time to use the bus where T0 is the time corresponding to the time period between point B and point C in FIG. 4 and required for obtaining the bus-using right after the generation of the bus-using request signal. Hence, in place of the first timer 131, a timer having a variable set time value Tx is provided, and the time value Tx is determined to satisfy Tx=T−T0 where the time T is the known time up to the next bus use time. The second timer is driven to start at the same time that the bus-using request signal BR is turned ON in the same manner as described above.

Further, in the first embodiment of the present invention, the bus-using right control system of the second embodiment can be employed in combination.

According to the present invention, as described above, in a multibus system, a bus-using right obtaining operation is not started after it is found that data transfer by using another bus is required, but in advance before that time, such that the time for obtaining the bus-using right can become seemingly zero to quicken the access. Also, even after the bus-using right for another bus is obtained, in case that the data transfer is not required, the bus-using right is immediately discarded, and hence the bus is not occupied any more than necessary.

Further, in a common bus system where data transfer occurs every certain time period or a next bus using time is estimated, by outputting a bus-using request prior to that time, the bus-using right is obtained at time requiring the next data transfer to quicken the access. Also, when a situation that no data transfer is required by any reason after a certain time period has elapsed, the bus-using right is discarded immediately. As a result, the bus is not occupied more than necessary to reduce the bus occupation rate.

Although the present invention has been described in its preferred embodiments with reference to the accompanying drawings, it will be readily understood that the present invention is not restricted to the preferred embodiments and that various changes and modifications can be made by those skilled in the art without departing from the spirit and scope of the present invention.

What is claimed is:

1. A bus system comprising:
   a first bus;
   a first master unit and a first slave unit each connected to the first bus;
   a first bus arbiter coupled to the first master unit for carrying out arbitration of a bus-using right of the first bus;
   a second bus coupled to the first bus;
   a second master unit and a second slave unit each connected to the second bus;
   an address decoder connected to the second bus for decoding an address outputted to the second bus from the second master unit and for discriminating whether the second master unit is to access the first slave unit or the second slave unit based on the decoded address; and
   a second bus arbiter coupled to the second master unit for carrying out arbitration of a bus-using right of the second bus, for outputting a bus-using request signal for the first bus to the first bus arbiter in response to a bus-using request signal outputted from the second master unit, and for discarding the bus-using request signal for the first bus to the first bus arbiter in response to a signal outputted from the address decoder indicating that the second master unit is to access the second slave unit.

2. An apparatus for controlling a bus-using right in a bus system wherein a first master unit, a second master unit, and at least one slave unit are connected to a common bus, said first master unit uses the common bus, and at least said second master unit accesses one slave unit of said at least one slave unit via the common bus to transfer data between said second master unit and said one slave unit at predetermined time intervals (T1) determined by said second master unit, the apparatus comprising:
   first timer means responsive to said second master unit for determining when a predetermined time T2 (T2<T1) has elapsed after said second master unit started one data transfer;
   means responsive to said first timer means for issuing a bus-using request when the time T2 has elapsed after said second master unit started the one data transfer in order to acquire a bus-using right for the common bus for said second master unit in advance of said second master unit starting another data transfer;
   means responsive to the bus-using request for granting the bus-using right for the common bus for said second master unit in advance of said second master unit starting the another data transfer, thereby allowing said second master unit to start the another data transfer immediately when the time T1 has passed after said second master unit started the one data transfer;
   second timer means responsive to the bus-using request for determining when a predetermined time T3 (T2+T3>T1) has elapsed after the bus-using request was issued; and
   means responsive to said second timer means and said second master unit for discarding the bus-using right granted in advance when said second master unit has not started the another data transfer when the time T3 has elapsed after the bus-using request was issued.

3. A bus system with a plurality of units connected to a common bus, wherein at least one unit of the units uses the common bus at predetermined timings, the bus system comprising:
   a bus arbiter coupled to each of said units for carrying out arbitration of a bus-using right of the common bus;
   first timer means for measuring a first time period indicative of a timing at which said one unit will next begin to use the common bus and for producing a first output signal when the first time period has been measured;
   second timer means for measuring a second time period during which said one unit does not use the common bus and for producing a second output signal when the second time period has been measured; and
   request control means connected to said one unit, said bus arbiter, said first timer means, and said second timer means for driving said first timer means to start measuring the first time period when said one unit begins to use the common bus, for generating a bus-using request to said bus arbiter in response to the first output signal from said first timer means, for driving said second timer means to start measuring the second time period when the bus-using request is issued, for resetting the second timer means if said one unit begins to use the common bus before the second timer produces the second output signal, and for cancelling the bus-using request if said second timer means produces the second output signal before said one unit begins to use the common bus.

* * * * *